US009820312B2

United States Patent
Wu

(10) Patent No.: US 9,820,312 B2
(45) Date of Patent: Nov. 14, 2017

(54) NETWORK OPTIMIZATION METHOD, DEVICE AND SYSTEM FOR RADIO LINK FAILURE

(71) Applicant: China Academy of Telecommunications Technology, Beijing (CN)

(72) Inventor: Yumin Wu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 59 days.

(21) Appl. No.: 14/765,640

(22) PCT Filed: Mar. 25, 2014

(86) PCT No.: PCT/CN2014/074041
§ 371 (c)(1),
(2) Date: Aug. 4, 2015

(87) PCT Pub. No.: WO2014/154132
PCT Pub. Date: Oct. 2, 2014

(65) Prior Publication Data
US 2015/0373754 A1 Dec. 24, 2015

(30) Foreign Application Priority Data
Mar. 26, 2013 (CN) .......................... 2013 1 0100018

(51) Int. Cl.
*H04L 29/14* (2006.01)
*H04W 76/02* (2009.01)
(Continued)

(52) U.S. Cl.
CPC ........... *H04W 76/02* (2013.01); *H04W 24/02* (2013.01); *H04W 24/04* (2013.01); *H04W 24/10* (2013.01);
(Continued)

(58) Field of Classification Search
None
See application file for complete search history.

(56) References Cited

U.S. PATENT DOCUMENTS

2010/0124918 A1 5/2010 Agashe et al.
2013/0153298 A1* 6/2013 Pietraski .................. E21B 7/04
175/45
(Continued)

FOREIGN PATENT DOCUMENTS

CN 102036243 A 4/2011
CN 102217353 A 10/2011
(Continued)

OTHER PUBLICATIONS

International Search Report for PCT/CN2014/074041 dated Jul. 1, 2014.
(Continued)

*Primary Examiner* — Edan Orgad
*Assistant Examiner* — Sithu Ko
(74) *Attorney, Agent, or Firm* — Foley & Lardner LLP

(57) ABSTRACT

Disclosed are a network optimization method, device and system for a radio link failure (RLF), the method comprising: if a local base station determines, after receiving an RLF report transmitted by a UE, that the RLF report is a link failure related to bearer separation, then transmitting the RLF report to a macro eNB; the macro eNB determines the cause of the link failure according to the RLF report and a bearer separation and recovery process, such that the macro eNB involved in the cause of the link failure conducts parameter adjustment, thus achieving self-configuration and self-optimization according to the RLF report reported by the UE when setting the parameter related to bearer separation.

12 Claims, 3 Drawing Sheets

(51) Int. Cl.

| | | |
|---|---|---|
| *H04W 24/10* | (2009.01) | |
| *H04W 24/04* | (2009.01) | |
| *H04W 24/02* | (2009.01) | |
| *H04W 36/16* | (2009.01) | |
| *H04W 88/02* | (2009.01) | |
| *H04W 88/08* | (2009.01) | |

(52) U.S. Cl.
CPC ....... *H04W 36/165* (2013.01); *H04W 76/027* (2013.01); *H04W 88/02* (2013.01); *H04W 88/08* (2013.01)

(56) References Cited

U.S. PATENT DOCUMENTS

| | | | | |
|---|---|---|---|---|
| 2014/0148174 | A1* | 5/2014 | Teyeb | H04W 36/0083 455/441 |
| 2015/0181479 | A1* | 6/2015 | Lin | H04W 36/0061 370/331 |
| 2015/0223106 | A1* | 8/2015 | Van Phan | H04L 29/14 370/225 |
| 2015/0237546 | A1* | 8/2015 | Lin | H04W 36/08 455/436 |
| 2015/0312933 | A1* | 10/2015 | Eriksson | H04W 72/1263 370/329 |

FOREIGN PATENT DOCUMENTS

| | | |
|---|---|---|
| CN | 102217354 | 10/2011 |
| CN | 102378282 | 3/2012 |
| CN | 102754496 A | 10/2012 |
| WO | WO-2010/057125 | 5/2010 |
| WO | WO-2011/100673 | 8/2011 |

OTHER PUBLICATIONS

CMCC: "RLF cause consideration", 3GPP Draft; R3-091697 RLF Cause Consideration, 3rd Generation Partnership Project (3GPP), Mobile Competence Centre, 650, Route Des Lucioles ; F-06921 Sophia-Antipolis Cedex ; France, no. Shenzhen, China; Aug. 20, 2009, Aug. 20, 2009 (Aug. 20, 2009), XP050353080 [retrieved on Aug. 20, 2009].

Fujitsu: "Timers in MRO failure detection in Small Cell scenarios", 3GPP Draft; R3-130057, 3rd Generation Partnership Project (3GPP), Mobile Competence Centre ; 650, Route Des Lucioles , F-06921 Sophia-Antipolis Cedex; France, vol. RAN WG3, no. Malta; Jan. 28, 2013-Feb. 1, 2013 Jan. 18, 2013 (Jan. 18, 2013), XP050670880, Retrieved from the Internet: URL:http://www.3gpp.org/ftp/tsg_ran/WG3_Iu/TSGR3_79/Docs/ [retrieved on Jan. 18, 2013].

* cited by examiner

NETWORK OPTIMIZATION METHOD, DEVICE AND SYSTEM FOR RADIO LINK FAILURE

This application is a US National Stage of International Application No. PCT/CN2014/074041, filed on Mar. 25, 2014, designating the United States and claiming the priority to Chinese Patent Application No. 201310100018.4, filed with the State Intellectual Property Office of People's Republic of China on Mar. 26, 2013 and entitled "Network optimization method, device and system for radio link failure", the content of which is hereby incorporated by reference in its entirety.

FIELD

The present invention relates to the field of communications and particularly to a network optimization method, device and system for radio link failure.

BACKGROUND

As more and more various home eNBs, pico cells, relay nodes and other Local evolved NodeBs (LeNBs) are deployed, the traditional network architecture in which Macro eNBs (MeNBs) are predominant will evolve gradually into a network architecture in which more types of eNBs coexist to provide layered network coverage. In order to improve correlation performance in the network architecture in which the various types of eNBs coexist, a network architecture in which a plurality of eNBs cooperate/are aggregated with each other has been proposed. In this architecture, a part of Radio Bearers (RBs) of a User Equipment (UE) are active in a macro cell managed by the MeNB, where this part of the RBs include control plane bearers (i.e., Signaling Radio Bearers (SRBs)) and user plane bearers (i.e., Data Radio Bearers (DRBs)), and the other part of the bearers of the same UE (including SRBs and DRBs) are active in a small/local cell managed by the LeNB. If there is a Radio Link Failure (RLF) of the UE occurring in the cell managed by the LeNB, then the UE may be controlled by the MeNB to reestablish a bearer with the LeNB/MeNB, and also the UE may make an RLF report. However, the reason for the RLF of the UE occurring in the small cell may be that a bearer splitting parameter controlled by the MeNB/LeNB is set inappropriately.

There is the following layered network deployment scenario including a macro eNB and local eNBs:

In the layered network coverage environment as illustrated in FIG. 1, the macro eNB can provide underlying coverage, and the local eNB can provide hotspot coverage; and there is a high-speed data/signaling interface, i.e., an M-L interface (a wired or radio interface) between the macro eNB and the local eNB, and the UE can operate while being served by bath the macro eNB and the local eNB. If the UE connected to the macro eNB enters a coverage area of a cell corresponding to the local eNB, then the MeNB can transfer a part or all of data/signaling of the UE to the local eNB taking into account signal strengths, load balancing, etc., so that the UR can be served by the local eNB, thus enabling the UE to operate over resources of both the macro eNB and the local eNB, and inter-eNB aggregation. In this scenario, a plurality of Radio Bearers (RBs) of the UE can be carried respectively in a cell controlled by the macro eNB (i.e., a macro cell) and a cell controlled by the local eNB (i.e., a local/small cell), where the RBs split to the LeNB can include Data Radio Bearers (DRBs) and/or Signaling Radio Bearers (SRBs).

The eNB detects an RLF generally in the following two approaches. In the first approach, the eNB determines whether there is an RLF of the UE occurring in some cell, according to RLF information reported by the UE; and in the second approach, the eNB itself determines whether there is an RLF of the UE occurring in some cell.

In the first approach, the UE determines that an RLF is detected, and subsequently reports it to the eNB, upon detecting that any one of the following situations occurs:

The timer T310 expires;

A random access failure indicator at Multiple Access Channel (MAC) layer is received; and An indicator at Radio Link Control (RLC) layer that the maximum number of retransmissions is reached is received.

At this time if security of an access stratum is not activated, then the UE may release it Radio Resource Control (RRC) connection and enter the RRC_IDLE state; otherwise, the UE may initiate an RRC Connection Reestablish procedure.

In the second approach, the eNB itself can determine whether there is an RLF of the UE occurring in some cell, for example, when some timer expires, or according to the maximum number of retransmissions of some data packet, etc.

If there is an RLF of the UE occurring, then the UE makes an RLF report after the UE establishes/reestablishes an RRC connection. The UE makes the RLF report as follows: the UE reports an RLF report availability indicator; the eNB transmits an RLF report request in response to the indicator of the UE; and the UE makes its RLF report to the eNB in response to the RLF report request transmitted by the eNB. The UE reports the RLF report availability indicator generally by carrying it in other uplink control signaling including:

RRC Connection Reconfiguration Complete;
RRC Connection Reestablishment Complete; and
RRC Connection Setup Complete.

The UE distinguishes the following two types of the occurring connection failure reported in the RLF report from each other and signals explicit indicators thereof to the eNB:

A handover Failure (HOF) which is a connection failure occurring in a handover procedure; and An RLF which is a connection failure occurring in a non-handover procedure.

There are the following scenarios in question where the RLF report is made and processed without splitting bearers;

The RLF report is processed generally by handling the RLF/HOF of the UE in respective scenarios. The following three handovers are defined in the intra-LTE (LTE stands for Long Term Evolution):

A too late handover where after the UE has stayed in the cell for a very long period of time, the RLF occurs; and the UE attempts on reestablishing a radio link connection in a different cell;

A too early handover where the RLF occurs in a very short period of time after the handover from a source cell to a destination cell occurs, or the HOF occurs in the handover procedure; and the UE attempts on reestablishing a radio link connection in the source cell; and A handover to wrong cell where the RLF occurs in a very short period of time after the handover from a source cell to a destination cell occurs, or the HOF occurs in the handover procedure; and the UE attempts on reestablishing a radio link connection in a cell other than the source and destination cells; and These three handovers are detected as follow:

A failure after an attempt on reestablishing an RRC connection is detected:

For the too late handover, if the UE attempts on reestablishing a connection in a cell served by the eNB_B, and indicates the last serving cell is served by the eNB_A instead of the eNB_B, then the eNB-B reports this event to the eNB_A in an RLF indication procedure. The eNB_A can determine from information in an RLF Indication message whether there is a failure occurring in the serving cell.

For the too early handover, if the destination cell where the RLF occurs is served by the eNB_B instead of the eNB_A, and the UE reestablishes a connection with the eNB_A, and makes the RLF report, after the connection failure; if the eNB_B receives an RLF Indication message from the eNB_A, and if the eNB_B has transmitted a UE Context Release message to the eNB_A, and the UE has been handed-over successfully for a period of time which is in a Tstore_UE_cntxt or there is a handover of the UE prepared at the eNB_B side, then the eNB_B transmits a Handover Report message to the eNB_A to indicate the too early handover event.

For the handover to wrong cell, if the destination cell where the RLF occurs is served by the eNB_B instead of the eNB_A (controlling the source cell), and the UE reestablishes a connection with the eNB_C, and makes the RLF report, after the connection failure; if the eNB_B receives an RLF indication message from the eNB_C, and if the eNB_B has transmitted a UE Context Release message to the eNB_A, and the UE has been handed-over successfully for a period of time in a Tstore_UE_cntxt or there is a handover of the UE prepared at the eNB_B side, then the eNB_B transmits a Handover Report message to the eNB_A, to indicate the handover to wrong cell event. This procedure will also apply in the case that the eNB_A and the eNB_C are the same eNB. In the case that the eNB_B and the eNB_C are the same eNB, the RLF Indication message is transmitted within the eNB.

If the handover failure occurs in a handover procedure initiated from a cell of the eNB_A, and the UE attempts on reestablishing a connection with a cell of the eNB_C, then the eNB_C can transmit an RLF indication message to the eNB_A.

A failure after the RRC connection is established is detected:

For the too late handover, the UE has not been recently handed-over before the connection failure, for example, the UE has not reported temporal information, or the reported temporal information is above a configured threshold, e.g., Tstore_UE_cnxt.

For the too early handover, the UE has been recently handed-over before the connection failure, for example, the UE reports temporal information below a configured threshold, e.g., Tstore_UE_cnxt, and initially attempts on reestablishing a connection in a cell which initiates the last handover and serves the UE.

For the handover to wrong cell, the UE has been recently handed-over before the connection failure, for example, the UE reports temporal information below a configured threshold, e.g., Tstore_UE_cnxt, and initially attempts on reestablishing a connection in a cell which is neither a cell which initiates the last handover and serves the UE, nor a cell serving the UE when the RLF occurs or a cell to which the handover is initiated.

For the too early handover or the handover to wrong cell, the eNB receiving the RLF Indication message transmits a Handover Report message to the eNB controlling the cell in which the failure occurs due to mobility configuration. From the perspective of the network side, the detection of a failure after the RRC connection is established is not significantly different from the detection of a failure after the RRC connection is reestablished.

A connection failure occurs under bearer splitting:

Firstly in the scenario in question where there is a connection failure under bearer splitting, if there is a connection failure of the UE occurring in the macro cell in the bearer splitting scenario, any connection of the UE in a non-standalone local cell (the UE can not operate in a standalone mode in this type of cell but can only operate under the control of the macro cell) may fail. The connection failure arises primarily due to inappropriate setting of mobility parameters between the MeNBs, and can be handled by the network using the same approach as the detection of a failure after an attempt on reestablishing an RRC connection. A connection of the UE in a standalone local cell (the UE can operate in a standalone mode in this type of cell) can still operate, and the UE only needs to reestablish a related bearer on the LeNB, and alike the connection failure also arises primarily due to inappropriate setting of mobility parameters between the MeNBs, and can also be handled by the network side using the same approach as the detection of a failure after an attempt on reestablishing RRC connection.

Thus a bearer splitting scenario to be taken into special account is a scenario in question where the mobility related parameter is inappropriately set between the MeNB and the LeNB, i.e., a scenario where there is no connection failure of a bearer occurring on the macro cell, but there is a connection failure occurring on the local cell. There may be the following scenarios where there is a connection failure of a bearer occurring on the local/small cell:

In a first scenario, there is a bearer splitting failure without macro cell handover. Since this bearer splitting is generally bearer splitting under the circumstance that the UE and the LeNB are controlled by the MeNB, the bearer splitting failure is primarily due to inappropriate setting of the mobility parameter by the current MeNB. In this case, the RLF report made by the UE is generally made to the current MeNB or the LeNB controlled by the current MeNB.

The following splitting instances may tend to occur:

1.1 RB split too early;

1.2 RB split too late; and 1.3 RB split to wrong cell.

In a second scenario, there is a bearer splitting failure with a macro cell handover (the macro cell handover procedure and the small cell bearer splitting procedure of the UE are performed concurrently in the macro cell handover procedure). Since this bearer splitting is generally bearer splitting under the circumstance that the UE and the LeNB are controlled by the source MeNB and the destination MeNB, the bearer splitting failure is primarily due to inappropriate setting of the mobility parameter by the source MeNB. In this case, the RLF report made by the UE is generally made to the destination MeNB or the LeNB controlled by the destination MeNB.

Likewise, the splitting instances in the first scenario may also occur:

1.1 RB split too early;

1.2 RB split too late; and 1.3 RB split to wrong cell.

Secondly if there is an RLF occurring related to bearer splitting, then the UE makes an RLF report to the network side. As distinguished from the types of connection establishment failures, i.e., the HOF and the RLF, indicated previously in the RLF report, the connection of the UE on the macro cell in the bearer splitting scenario may be kept active, while there is only a radio link failure of the split bearer (the bearer on the local/small cell) occurring. Thus in order to better assist the network side in handling different types of connection failures, the LIE needs to distinguish the bearer splitting connection failure occurring on the local cell in this bearer splitting situation from the other types of connection failures when making the RLF report, to thereby make it more convenient for the network side to handle the connection failure pertinently and set a more reasonable mobility parameter related to bearer splitting.

Thirdly the network side processes the received RLF report made by the UE. The network side needs to be able to identify reasonably and treat differently the scenarios above in question.

As can be apparent, the bearer splitting scenario has not been taken into account in the improvement solution of the network to the connection failure as specified in the existing protocol so that there are absent a solution to cooperation between the network nodes and a solution to cooperation between the network and the UE, so the network nodes can not set the parameter related to bearer splitting by configuring and optimizing themselves according to the RLF report made by the UE.

SUMMARY

Embodiments of the invention provide a network optimization method, device and system for a radio link failure so as to set a parameter related to bearer splitting by configuring and optimizing a network node according to an RLF report made by a UE.

A network optimization method for a radio link failure includes:
  receiving, by a macro base station, a Radio Link Failure, RLF, report forwarded by a local base station, wherein the local base station receives the RLF report transmitted by a User Equipment, UE, and forwards the RLF report to the macro base station upon determining that the RLF report relates to a connection failure related to bearer splitting; and
  determining, by the macro base station, a connection failure reason according to the RLF report, and bearer splitting and restoring procedures, so that a macro base station involved in the connection failure reason adjusts a parameter.

A network optimization method for a radio link failure includes:
  receiving, by a local base station, a Radio Link Failure, RLF, report transmitted by a User Equipment, UE; and
  forwarding, by the local base station, the RLF report to a macro base station upon determining that the RLF report relates to a connection failure related to bearer splitting, so that the macro base station determines a connection failure reason according to the RLF report, and bearer splitting and restoring procedures, and a macro base station involved in the connection failure reason adjusts a parameter.

A network optimization device for a radio link failure includes:
  a receiving unit configured to receive a Radio Link Failure, RLF, report forwarded by a local base station, wherein the local base station receives the RLF report transmitted by a User Equipment, UE, and forwards the RLF report upon determining that the RLF report relates to a connection failure related to hearer splitting; and
  a determining unit configured to determine a connection failure reason according to the RLF report, and bearer splitting and restoring procedures, so that a macro base station involved in the connection failure reason adjusts a parameter.

A network optimization device for a radio link failure includes:
  a report receiving unit configured to receive an RLF report transmitted by a User Equipment, UE; and
  a forwarding unit configured to forward the RLF report to a macro base station upon determining that the RLF report relates to a connection failure related to bearer splitting, so that the macro base station determines a connection failure reason according to the RLF report, and bearer splitting and restoring procedures, and a macro base station involved in the connection failure reason adjusts a parameter.

A network optimization system for a radio link failure includes:
  a local base station configured to receive an RLF report transmitted by a User Equipment, UE, and to forward the RLF report to a macro base station upon determining that the RLF report relates to a connection failure related to bearer splitting; and
  the macro base station configured to receive the RLF report forwarded by the local base station; and to determine a connection failure reason according to the RLF report, and bearer splitting and restoring procedures, so that a macro base station involved in the connection failure reason adjusts a parameter.

A macro base station includes:
  a transceiver configured to receive a Radio Link Failure, RLF, report forwarded by a local base station, wherein the local base station receives the RLF report transmitted by a User Equipment, UE, and forwards the RLF report upon determining that the RLF report relates to a connection failure related to bearer splitting; and
  a processor configured to determine a connection failure reason according to the RLF report received by the transceiver 403, and bearer splitting and restoring procedures, so that a macro base station involved in the connection failure reason adjusts a parameter.

A local base station includes:
  a transceiver configured to receive an RLF report transmitted by a User Equipment, UE; and
  a processor configured to forward the RLF report to a macro base station through the transceiver upon determining that the RLF report received by the transceiver relates to a connection failure related to bearer splitting, so that the macro base station determines a connection failure reason according to the RLF report, and bearer splitting and restoring procedures, and a macro base station involved in the connection failure reason adjusts a parameter.

The embodiments of the invention provide a network optimization method, device and system for a radio link failure, where if the local base station determines that the RLF report transmitted by the UE relates to a connection failure to bearer splitting upon reception of the RLF report, then the local base station transmits the RLF report to the macro base station, and the macro base station determines the connection failure reason according to the RLF report, and the bearer splitting and restoring procedures, so that the macro base station involved in the connection failure reason adjusts the parameter and sets the parameter related to bearer splitting by configuring and optimizing the macro base station according to the RLF report made by the UE.

DETAILED DESCRIPTION OF THE EMBODIMENTS

Embodiments of the invention provide a network optimization method, device and system for a radio link failure, where if a local base station determines that an RLF report transmitted by a UE relates to a connection failure related to bearer splitting upon reception of the RLF report, then the local base station transmits the RLF report to a macro base station, and the macro base station determines a connection failure reason according to the RLF report, and bearer splitting and restoring procedures, so that a macro base station involved in the connection failure reason adjusts a parameter and sets the parameter related to bearer splitting by configuring and optimizing the macro base station according to the RLF report made by the UE.

Figures 1, 2:
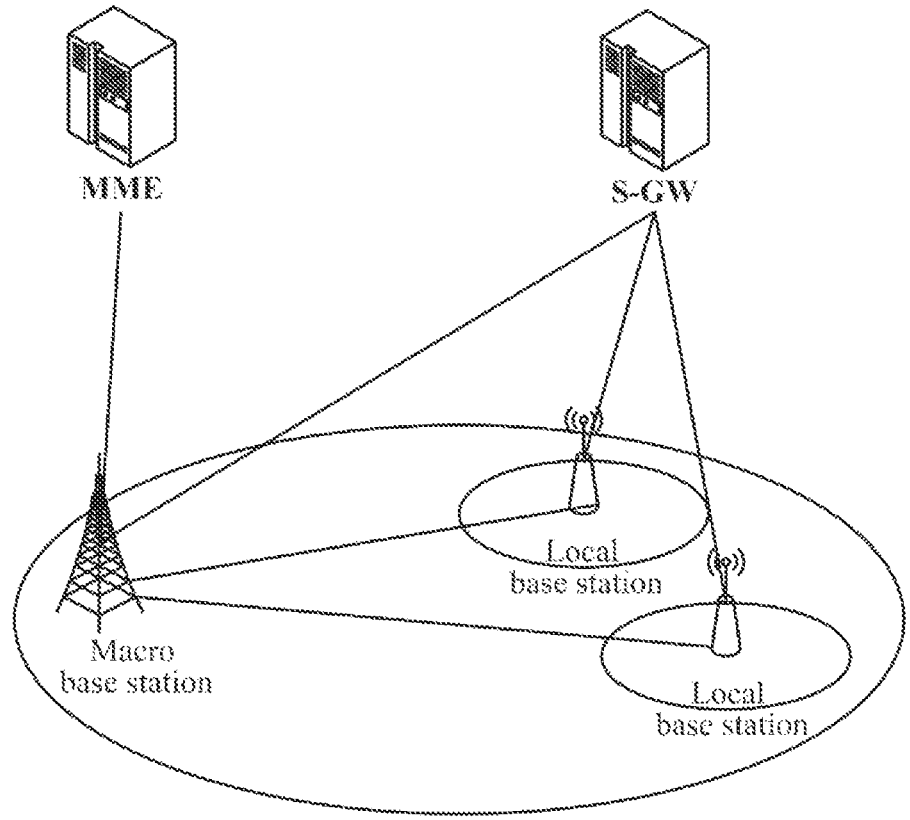
FIG. 1 illustrates a schematic diagram of the layered coverage network scenario in the prior art.
FIG. 2 illustrates a first flow chart of a network optimization method for a radio link failure according to an embodiment of the invention.

As illustrated in FIG. 2, a network optimization method for a radio link failure according to an embodiment of the invention includes:

In the operation S201, a macro base station receives a Radio Link Failure (RLF) report forwarded by a local base station, where the local base station receives the RLF report transmitted by a User Equipment (UE) and forwards the RLF report to the macro base station upon determining that the RLF report relates to a connection failure related to bearer splitting.

In the operation S202, the macro base station determines a connection failure reason according to the RLF report, and bearer splitting and restoring procedures, and a macro base station involved in the connection failure reason adjusts a parameter.

If there is a connection failure of the UE, the bearers of which are split, on the local cell, then the UE can make the RLF report to the LeNB/MeNB. The content of the report may include a bearer splitting connection failure type indicator; temporal information of the connection failure related to bearer splitting; bearer splitting and reestablishment related information; and other information.

Upon reception of the RLF report from the UE, the LeNB determines whether the connection failure is a connection failure on the local cell to which the bearer is split according to the information of the RLF report, and if so, then the LeNB forwards the information of the RLF report, and other related auxiliary information (e.g., the identifier of the UE, etc.) to the macro eNB of the UE.

Upon reception of the RLF report from the LeNB or the UE, the macro eNB determines the connection failure reason according to the RLF report, and the bearer splitting and restoring procedures, and the macro base station involved in the connection failure reason adjusts the parameter.

The macro eNB can firstly determine whether the connection failure is related to the last macro cell handover procedure (for example, the temporal information reported by the UE is below or equal to a configured threshold), and if so, then the macro eNB transmits the connection failure reason to a source macro base station involved in the handover procedure; otherwise, the macro eNB itself adjusts the parameter according to the connection failure reason.

If the connection failure is unrelated to a macro cell handover procedure (for example, the temporal information reported by the UE is above the configured threshold), then the MeNB determines the connection failure reason, and subsequently adjusts the bearer splitting parameter according to the failure reason and other information. The following connection failure reasons can be determined:

RB split too early: the UE for which the bearer is split has an RLF occurring on the small cell in a very short period of time after bearer splitting, or has an RLF occurring during bearer splitting procedure; and the UE attempts on reestablishing an RB in the source cell where the UE stayed before the RB is split (the source macro cell or the source small cell);

RB split too late: the UE for which the bearer is split has an RLF occurring after the UE has stayed in some small cell for a very long period of time; and the UE attempts on reestablishing an RB in a different cell (the macro cell or another small cell);

RB split to wrong cell: the UE for which the bearer is split has an RLF occurring on the small cell in a very short period of time after bearer splitting, or has an RLF occurring during bearer splitting; and the UE attempts on reestablishing an RB in a cell other than the source cell before the RB is split (the source macro cell or the source small cell), or a cell other than the destination cell in the RB splitting procedure (the destination small cell); and Other reasons.

If the connection failure is related to a macro cell handover procedure (for example, the temporal information reported by the UE is below or equal to the configured threshold), then the MeNB determines the connection failure reason, and transmits the connection failure reason and other related information (e.g., the RLF report of the UE, bearer reestablishment information, a context of the UE, etc.) to the source MeNB related to the handover. The following connection failure reasons can be determined:

RB split too early: the UE for which the bearer is split has an RLF occurring on the small cell of the LeNB controlled by the destination MeNB in a very short period of time after bearer splitting, or has an RLF occurring during bearer splitting procedure; and the UE attempts on reestablishing an RB in the source macro cell of the handover or in the source local cell (controllable by the source MeNB) of the RB prior to the handover;

RB split too late: for the LeNB controlled by both the source MeNB and the destination MeNB, the bearer on the LeNB may not be spilt again for the UE in the macro cell handover procedure. Thus the RB of the UE for which the bearer is split has an RLF occurring after the UE has stayed in the small cell controlled by the LeNB for a very long period of time; and the UE attempts on reestablishing an RB in a different cell (the destination macro cell after the handover, or a small cell controlled by the destination macro eNB);

RB split to wrong cell: the UE for which the bearer is split has an RLF occurring on the small cell in a very short period of time after bearer splitting, or has an RLF occurring during bearer splitting; and the UE attempts on reestablishing an RB in a cell other than the source cell before the RB is split (the local cell of the RB before the handover, or the destination macro cell after the handover), or a cell other than the destination cell in the RB splitting procedure (the destination local cell); and Other reasons.

The source MeNB related to the macro cell handover adjusts the bearer splitting related parameter upon reception of the connection failure related information related to bearer splitting from the destination MeNB.

Particularly, the macro base station determines the connection failure reason according to the RLF report, and the bearer splitting and restoring procedures, and the macro base station involved in the connection failure reason adjusts the parameter, in the operation S202 particularly as follows:

The macro base station determines the connection failure reason according to the RLF report, and the bearer splitting and restoring procedures, and adjusts the parameter, upon determining that the connection failure is unrelated to the handover procedure according to the RLF report.

Here it is determined that the RLF report relates to a connection failure unrelated to the handover procedure but related to bearer splitting particularly as follows:

It is determined that a temporal value of the connection failure of bearer splitting in the RLF report is above a preconfigured threshold, or there is no macro cell handover in the bearer splitting procedure.

The connection failure reason is determined according to the RLF report, and the bearer splitting and restoring procedures, and the parameter is adjusted, in the operation S202 particularly as follows:

The bearer split too early elated parameter is adjusted upon determining that the connection failure occurs in the bearer splitting procedure or occurs in a preset period of time after bearer splitting, and the UE reestablishes a bearer in a source cell of bearer splitting;

The bearer split too late related parameter is adjusted upon determining that the connection failure occurs after the preset period of time after bearer splitting, and the UE reestablishes a bearer in a cell other than the source cell of bearer splitting; and The bearer split to wrong cell related parameter is adjusted upon determining that the connection failure occurs in the bearer splitting procedure or occurs in the preset period of time after bearer splitting, and the UE reestablishes a bearer in a cell other than the source cell and the destination cell of bearer splitting.

If the RLF report is related to the handover procedure, then the macro base station determines the connection failure reason according to the RLF report, and the bearer splitting and restoring procedures, and the macro base station involved in the connection failure reason adjusts the parameter, in the operation S202 particularly as follows:

The macro base station determines the connection failure reason according to the RLF report, and the bearer splitting and restoring procedures, and transmits the connection failure reason to a source macro base station of the handover procedure upon determining that the connection failure is related to the source macro base station; and The source macro base station adjusts the parameter according to the connection failure reason.

Here it is determined that the connection failure is related to the source macro base station of the handover procedure particularly as follows:

It is determined that the temporal value of the connection failure of bearer splitting in the RLF report is below or equal to a preconfigured threshold, or there is a macro cell handover in the bearer splitting procedure.

At this time the macro eNB determines the connection failure reason according to the RLF report, and the bearer splitting and restoring procedures in the operation S202 particularly as follows:

The connection failure reason is determined as bearer split too early upon determining that the connection failure occurs in the bearer splitting procedure or occurs in a preset period of time after bearer splitting, and the UE reestablishes an RB in a source cell;

The connection failure reason is determined as bearer split too late upon determining that the connection failure occurs after the preset period of time after bearer splitting, and the UE reestablishes an RB in a destination cell; and The connection failure reason is determined as bearer split to wrong cell upon determining that the connection failure occurs in the bearer splitting procedure or occurs in the preset period of time after bearer splitting, and the UE reestablishes an RB in a cell other than the destination cell or the source cell.

Figure 3:
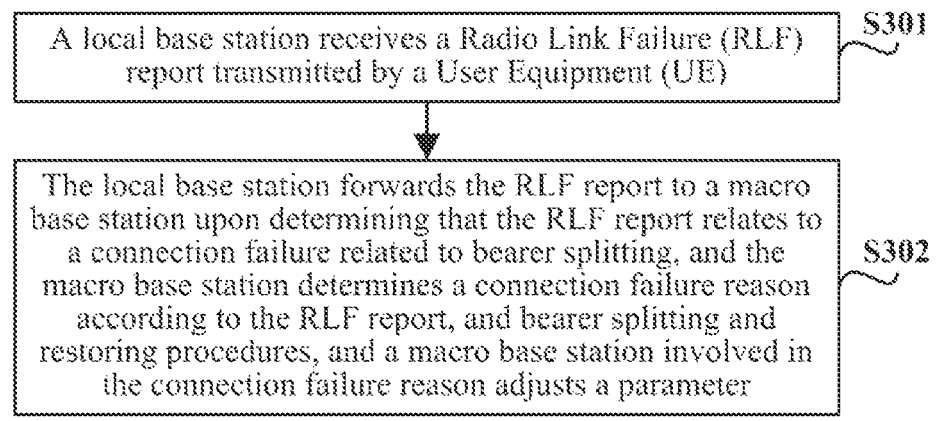
FIG. 3 illustrates a second flow chart of a network optimization method for a radio link failure according to an embodiment of the invention.

An embodiment of the invention further provides correspondingly a network optimization method at the local eNB side for a radio link failure, as illustrated in FIG. 3, the method including:

In the operation S301, a local base station receives a Radio Link Failure (RLF) report transmitted by a User Equipment (UE); and In the operation S302, the local base station forwards the RLF report to a macro base station upon determining that the RLF report relates to a connection failure related to bearer splitting, and the macro base station determines a connection failure reason according to the RLF report, and bearer splitting and restoring procedures, and a macro base station involved in the connection failure reason adjusts a parameter.

The network optimization method for a radio link failure will be described below in details in connection with particular embodiments thereof:

First Embodiment

This embodiment relates to bearer split too early unrelated to a macro cell handover.

In the operation 1, an MeNB splits a part of bearers (including DRBs and/or SRBs) of a UE on a macro/local cell to another local cell according to a measurement report made by the UE, a load situation of the cell, and other information;

In the operation 2, the UE detects an occurring connection failure related to the bearers while the bearers are being split or in a very short period of time after the bearers are split;

In the operation 3, the UE with the RLF occurring initiates a bearer reestablishment procedure on the MeNB/LeNB.

The UE is controlled by the current MeNB to reestablish RBs in the source cell where the UE resides before the RBs are split (the source macro cell or the source small cell);

In the operation 4, before/when/after the UE initiates the RB reestablishment procedure, the UE reports information about the connection failure, including a type of connection failure related to bearer splitting, temporal information related to bearer splitting, the identifier of serving cell of the UE before bearer splitting and the identifier of serving cell of the UE after bearer splitting, information about bearer reestablishment, a macro cell indicator, and other information, to the MeNB/LeNB in an RLF reporting procedure;

In the operation 5, if the LeNB receives the RLF report, then it determines the type of connection failure, and forwards the RLF report together with related auxiliary information to the current MeNB of the UE; and In the operation 6, the MeNB obtains the information related to the RLF report in the operation 4 or 5. The MeNB determines that the connection failure is unrelated to the macro cell handover and the connection failure occurs in the bearer splitting procedure or in a very short period of time after bearer splitting, according to the temporal information related to the connection failure of bearer splitting reported by the UE, and temporal information related to the bearer splitting preset by the MeNB to thereby determine that the connection failure occurs due to bearer split too early unrelated to the macro cell handover. The MeNB adjusts a parameter related to the bearer split too early.

Second Embodiment

This embodiment relates to bearer split too late unrelated to a macro cell handover.

In the operation 1, an MeNB splits a part of bearers (including DRBs and/or SRBs) of a UE on a macro/local cell to another local cell according to a measurement report made by the UE, a load situation of the cell, and other information;

In the operation 2, the UE detects an occurring connection failure related to the bearers in a very long period of time after the bearers are split;

In the operation 3, the UE with the RLF occurring initiates a bearer reestablishment procedure on the MeNB/LeNB. The UE is controlled by the current MeNB to reestablish RBs in a different cell (the macro cell or another small cell);

The operation 4 is the same as the operation 4 in the first embodiment;

The operation 5 is the same as the operation 5 in the first embodiment; and

In the operation 6, the MeNB obtains the information related to the RLF report in the operation 4 or 5. The MeNB determines that the connection failure is unrelated to the macro cell handover and the connection failure occurs in a very long period of time after bearer splitting, and the bearers are reestablished in a different cell, according to the temporal information related to the connection failure of bearer splitting reported by the UE, and temporal information related to the bearer splitting preset by the MeNB to thereby determine that the connection failure occurs due to bearer split too late unrelated to the macro cell handover. The MeNB adjusts a parameter related to the bearer split too late.

Third Embodiment

This embodiment relates to bearer split to wrong cell unrelated to a macro cell handover.

In the operation 1, an MeNB splits a part of bearers (including DRBs and/or SRBs) of a UE on a macro/local cell to another local cell according to a measurement report made by the UE, a load situation of the cell, and other information;

In the operation 2, the UE detects an occurring connection failure related to the bearers in a very short period of time after the bearers are split or during bearer splitting;

In the operation 3, the UE with the RLF occurring initiates a bearer reestablishment procedure on the MeNB/LeNB. The UE is controlled by the current MeNB to attempt on reestablishing RBs in a cell other than the source cell before the RBs are split (the source macro cell or the source small cell), or a cell other than the destination cell in the RB splitting procedure (the destination small cell);

The operation 4 is the same as the operation 4 in the first embodiment;

The operation 5 is the same as the operation 5 in the first embodiment; and

In the operation 6, the MeNB obtains the information related to the RLF report in the operation 4 or 5. The MeNB determines that the connection failure is unrelated to the macro cell handover and the connection failure occurs in a very short period of time after bearer splitting or during bearer splitting, and the bearers are reestablished in a cell other than the source and destination cells of bearer splitting according to the temporal information related to the connection failure of bearer splitting reported by the UE, and temporal information related to the bearer splitting preset by the MeNB to thereby determine that the connection failure occurs due to bearer split to wrong cell unrelated to the macro cell handover. The MeNB adjusts a parameter related to the bearer split to wrong cell.

Fourth Embodiment

This embodiment relates to bearer split too early related to a macro cell handover.

In the operation 1, when there is a macro cell handover happening for a UE for which bearers are split, a source MeNB of the handover transmits a handover request to a destination MeNB according to a measurement report made by the UE, a load situation of the cell, and other information, and provides the destination MeNB with a UE configuration related to bearer splitting, and a list of available candidate cells for bearer splitting after the handover. The destination MeNB may notify the source MeNB after selecting a list of cells for bearer splitting upon making an admission decision. The source MeNB transmits a handover command including the bearer splitting configuration of the handover procedure to the UE as configured by the destination MeNB. The UE establishes corresponding bearers (including DRBs and/or SRBs) on both the destination macro cell and the destination local cell in the handover procedure according to the received bearer splitting configuration of the handover procedure.

In the operation 2, for the current handover procedure, the UE detects a connection failure occurring related to the bearers while the bearers being established on the destination local cell or in a very short period of time thereafter;

In the operation 3, the UE with the RLF occurring initiates a bearer reestablishment procedure on the MeNB/LeNB. The UE is controlled by the current MeNB to attempt on reestablishing RBs in the source macro cell of the handover or in the source local cell (controllable by the source MeNB) of the RBs before the handover;

In the operation 4, before/when/after the UE initiates the RB reestablishment procedure, the UE reports information about the connection failure, including a type of connection failure related to bearer splitting, temporal information related to bearer splitting, the identifier of serving cell of the UE before bearer splitting and the identifier of serving cell of the UE after bearer splitting, information about bearer reestablishment, a macro cell indicator, and other information, to the MeNB/LeNB in an RLF reporting procedure;

In the operation 5, if the LeNB receives the RLF report, then it determines the type of connection failure, and forwards the RLF report together with related auxiliary information to the current MeNB of the UE;

In the operation 6, the MeNB obtains the information related to the RLF report in the operation 4 or 5. The MeNB determines that the connection failure is related to the macro cell handover and the connection failure occurs in the bearer splitting procedure or in a very short period of time after bearer splitting, and the UE reestablishes the RBs in the source macro cell of the handover or in the source local cell (controllable by the source MeNB) of the RBs before the handover, according to the temporal information related to the connection failure of bearer splitting reported by the UE, and temporal information related to the bearer splitting preset by the MeNB to thereby determine that the connection failure occurs due to bearer split too early related to the macro cell handover. The destination MeNB of the handover procedure transmits the connection failure reason and other related information (e.g., the RLF report of the UE, bearer reestablishment information, a context of the UE, etc.) to the source MeNB related to the handover procedure; and In the operation 7, the source MeNB related to the handover procedure adjusts a parameter related to bearer spilt too early related to the macro cell handover procedure upon reception of the connection failure information from the destination MeNB.

Fifth Embodiment

This embodiment relates to bearer split too late related to a macro cell handover.

In the operation 1, when there is a macro cell handover happening for a UE for which bearers are split, a source MeNB of the handover transmits a handover request to a destination MeNB according to a measurement report made by the UE, a load situation of the cell, and other information, and provides the destination MeNB with a UE configuration related to bearer splitting, and a list of available candidate cells for bearer splitting after the handover. The destination MeNB may notify the source MeNB after selecting a list of cells for bearer splitting upon making an admission decision. It is possible that the cells for bearer splitting selected by the destination MeNB may include local cells for bearer splitting which have been configured for the UE by the source MeNB, thus the UE may not change these cells for bearer splitting. The source MeNB transmits a handover command including the bearer splitting configuration of the handover procedure to the UE as configured by the destination MeNB. The UE establishes corresponding bearers (including DRBs and/or SRBs) on both the destination macro cell and the destination local cell in the handover procedure according to the received bearer splitting configuration of the handover procedure.

In the operation 2, for the destination local cell which is not changed in the current handover procedure, the UE detects a connection failure occurring related to the bearers in a very long period of time after the UE establishes the bearers in the cell (including the bearers established under the control of the source MeNB);

In the operation 3, the UE with the RLF occurring initiates a bearer reestablishment procedure on the MeNB/LeNB. The UE is controlled by the current MeNB to attempt on reestablishing RBs in a different cell (the destination macro cell after the handover or the small cell controllable by the destination MeNB);

The operation 4 is the same as the operation 4 in the fourth embodiment;

The operation 5 is the same as the operation 5 in the fourth embodiment;

In the operation 6, the MeNB obtains the information related to the RLF report in the operation 4 or 5. The MeNB determines that the connection failure is related to the macro cell handover and the connection failure occurs after the UE for which the bearers are split has stayed in the local cell controlled by the LeNB for a very long period of time, according to the temporal information related to the connection failure of bearer splitting reported by the UE, and temporal information related to the bearer splitting preset by the MeNB to thereby determine that the connection failure occurs due to bearer split too late related to the macro cell handover. The destination MeNB of the handover procedure transmits the connection failure reason and other related information (e.g., the RLF report of the UE, bearer reestablishment information, a context of the UE, etc.) to the source MeNB related to the handover procedure; and In the operation 7, the source MeNB related to the handover procedure adjusts a parameter related to bearer spilt too late related to the macro cell handover procedure upon reception of the connection failure information from the destination MeNB.

Sixth Embodiment

This embodiment relates to bearer split to wrong cell related to a macro cell handover.

In the operation 1, when there is a macro cell handover happening for a UE for which bearers are split, a source MeNB of the handover transmits a handover request to a destination MeNB according to a measurement report made by the UE, a load situation of the cell, and other information, and provides the destination MeNB with a UE configuration related to bearer splitting, and a list of available candidate cells for bearer splitting after the handover. The destination MeNB may notify the source MeNB after selecting a list of cells for bearer splitting upon making an admission decision. The source MeNB transmits a handover command including the bearer splitting configuration of the handover procedure to the UE as configured by the destination MeNB. The UE establishes corresponding bearers (including DRBs and/or SRBs) on both the destination macro cell and the destination local cell in the handover procedure according to the received bearer splitting configuration of the handover procedure.

In the operation 2, for the current handover procedure, the UE detects a connection failure occurring related to the bearers while the bearers are being established in the destination local cell or in a very short period of time thereafter;

In the operation 3, the UE with the RLF occurring initiates a bearer reestablishment procedure on the MeNB/LeNB. The UE is controlled by the current MeNB to attempt on reestablishing RBs in a cell other than the source cell before the RBs are split (the local cell of the RBs before the handover or the destination macro cell after the handover) or in a cell other than the destination cell in the RB splitting procedure (the destination local cell);

The operation 4 is the same as the operation 4 in the fourth embodiment;

The operation 5 is the same as the operation 5 in the fourth embodiment;

In the operation 6, the MeNB obtains the information related to the RLF report in the operation 4 or 5. The MeNB determines that the connection failure is related to the macro cell handover and the connection failure occurs in the bearer splitting procedure or in a very short period of time after bearer splitting, and the UE reestablishes the RBs in the cell other than the destination macro cell of the handover or in the cell other than the source local cell (controllable by the source MeNB) of the RBs before the handover, according to the temporal information related to the connection failure of bearer splitting reported by the UE, and temporal information related to the bearer splitting preset by the MeNB to thereby determine that the connection failure occurs due to bearer split to wrong cell related to the macro cell handover. The destination MeNB of the handover procedure transmits the connection failure reason and other related information (e.g., the RLF report of the UE, bearer reestablishment information, a context of the UE, etc.) to the source MeNB related to the handover procedure; and In the operation 7, the source MeNB related to the handover procedure adjusts a parameter related to bearer split to wrong cell related to the macro cell handover procedure upon reception of the connection failure information from the destination MeNB.

Figure 4A:
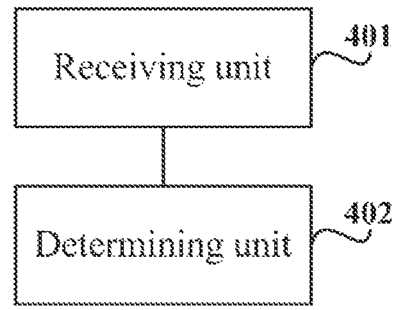
FIG. 4a illustrates a first schematic structural diagram of a network optimization device for a radio link failure according to an embodiment of the invention.

An embodiment of the invention further provides correspondingly a network optimization device for a radio link failure, where the device can particularly a macro base station as illustrated in FIG. 4a including:

A receiving unit 401 is configured to receive a Radio Link Failure (RLF) report forwarded by a local base station, where the local base station receives the RLF report transmitted by a User Equipment (UE) and forwards the RLF report upon determining that the RLF report relates to a connection failure related to bearer splitting; and A determining unit 402 is configured to determine a connection failure reason according to the RLF report, and bearer splitting and restoring procedures, so that a macro base station involved in the connection failure reason adjusts a parameter.

The determining unit 402 is configured:

For a macro base station to determine the connection failure reason according to the RLF report, and the bearer splitting and restoring procedures, and to adjust the parameter, upon determining that the connection failure is unrelated to a handover procedure according to the RLF report.

The determining unit 402 configured to determine that the RLF report relates to a connection failure unrelated to the handover procedure but related to bearer splitting is configured:

To determine that a temporal value of the connection failure of bearer splitting in the RLF report is above a preconfigured threshold, or there is no macro cell handover in the bearer splitting procedure.

The determining unit 402 configured to determine the connection failure reason according to the RLF report, and the bearer splitting and restoring procedures, and to adjust the parameter is configured:

To adjust the bearer split too early related parameter upon determining that the connection failure occurs in the bearer splitting procedure or occurs in a preset period of time after bearer splitting, and the UE reestablishes a bearer in a source cell of bearer splitting;

To adjust the bearer split too late related parameter upon determining that the connection failure occurs after the preset period of time after bearer splitting, and the UE reestablishes a bearer in a cell other than the source cell of bearer splitting; and To adjust the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

The determining unit 402 is configured:

To determine the connection failure reason according to the RLF report, and the bearer splitting and restoring procedures, and to transmit the connection failure reason to a source macro base station of the handover procedure upon determining that the connection failure is related to the source macro base station, so that the source macro base station adjusts the parameter according to the connection failure reason.

The determining unit 402 configured to determine that the connection failure is related to the source macro base station of the handover procedure is configured:

To determine that the temporal value of the connection failure of bearer splitting in the RLF report is below or equal to a preconfigured threshold, or there is a macro cell handover in the bearer splitting procedure.

The determining unit 402 configured to determine the connection failure reason according to the RLF report, and the bearer splitting and restoring procedures is configured:

To determine the connection failure reason as bearer split too early upon determining that the connection failure occurs in the bearer splitting procedure or occurs in a preset period of time after bearer splitting, and the UE reestablishes an RB in a source cell;

To determine the connection failure reason as bearer split too late upon determining that the connection failure occurs after the preset period of time after bearer splitting, and the UE reestablishes an RB in a destination cell; and To determine the connection failure reason as bearer split to wrong cell upon determining that the connection failure occurs in the bearer splitting procedure or occurs in the preset period of time after bearer splitting, and the UE reestablishes an RB in a cell other than the destination cell or the source cell.

Figure 4B:
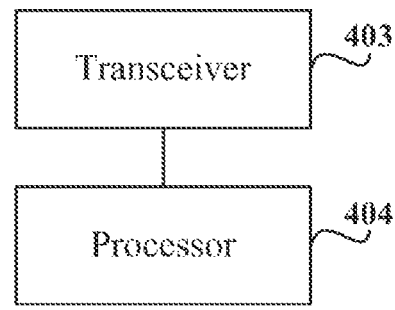
FIG. 4b illustrates a schematic structural diagram of a macro base station according to an embodiment of the invention.

Based upon the same principle, an embodiment of the invention further provides correspondingly a macro base station as illustrated in FIG. 4b generally including:

A transceiver 403 is configured to receive a Radio Link Failure (RLF) report forwarded by a local base station, where the local base station receives the RLF report transmitted by a User Equipment (UE) and forwards the RLF report upon determining that the RLF report relates to a connection failure related to bearer splitting; and A processor 404 is configured to determine a connection failure reason according to the RLF report received by the transceiver 403, and bearer splitting and restoring procedures, so that a macro base station involved in the connection failure reason adjusts a parameter.

The processor 404 is configured:

To determine the connection failure reason according to the RLF report, and the bearer splitting and restoring procedures, and to adjust the parameter, upon determining that the connection failure is unrelated to a handover procedure according to the RLF report.

The processor 404 configured to determine that the RLF report relates to a connection failure unrelated to the handover procedure but related to bearer splitting is configured:

To determine that a temporal value of the connection failure of bearer splitting in the RLF report is above a preconfigured threshold, or there is no macro cell handover in the bearer splitting procedure.

The processor 404 configured to determine the connection failure reason according to the RLF report, and the bearer splitting and restoring procedures, and to adjust the parameter is configured:

To adjust the bearer split too early related parameter upon determining that the connection failure occurs in the bearer splitting procedure or occurs in a preset period of time after bearer splitting and the UE reestablishes a bearer in a source cell of bearer splitting;

To adjust the bearer split too late related parameter upon determining that the connection failure occurs after the preset period of time after bearer splitting, and the UE reestablishes a bearer in a cell other than the source cell of bearer splitting; and To adjust the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

The processor 404 is configured:

To determine the connection failure reason according to the RLF report, and the bearer splitting and restoring procedures, and to transmit the connection failure reason to a source macro base station of the handover procedure through the transceiver 403 upon determining that the connection failure is related to the source macro base station, so that the source macro base station adjusts the parameter according to the connection failure reason.

The processor 404 configured to determine that the connection failure is related to the source macro base station of the handover procedure is configured:

To determine that the temporal value of the connection failure of bearer splitting in the RLF report is below or equal to a preconfigured threshold, or there is a macro cell handover in the bearer splitting procedure.

The processor 404 configured to determine the connection failure reason according to the RLF report, and the bearer splitting and restoring procedures is configured:

To determine the connection failure reason as bearer split too early upon determining that the connection failure occurs in the bearer splitting procedure or occurs in a preset period of time after bearer splitting, and the UE reestablishes an RB in a source cell;

To determine the connection failure reason as bearer split too late upon determining that the connection failure occurs after the preset period of time after bearer splitting, and the UE reestablishes an RB in a destination cell; and To determine the connection failure reason as bearer split to wrong cell upon determining that the connection failure occurs in the bearer splitting procedure or occurs in the preset period of time after bearer splitting, and the UE reestablishes an RB in a cell other than the destination cell or the source cell.

Figure 5A:
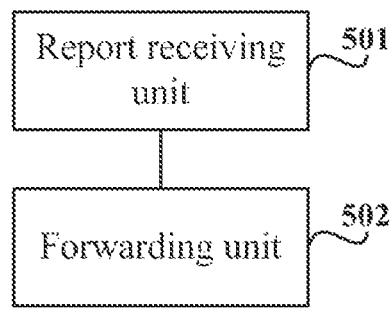
FIG. 5a illustrates a second schematic structural diagram of a network optimization device for a radio link failure according to an embodiment of the invention.

An embodiment of the invention further provides correspondingly a network optimization device for a radio link failure, which can particularly a local base station as illustrated in FIG. 5a including:

A report receiving unit 501 is configured to receive an RLF report transmitted by a User Equipment (UE); and A forwarding unit 502 is configured to forward the RLF report to a macro base station upon determining that the RLF report relates to a connection failure related to bearer splitting, so that the macro base station determines a connection failure reason according to the RLF report, and bearer splitting and restoring procedures, and a macro base station involved in the connection failure reason adjusts a parameter.

Figure 5B:
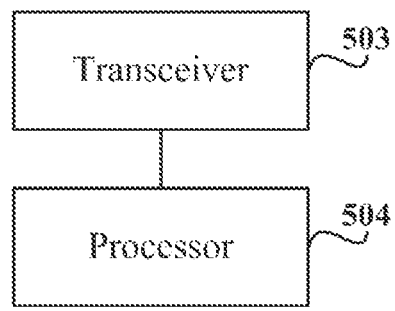
FIG. 5b illustrates a schematic structural diagram of a local base station according to an embodiment of the invention.

Based upon the same principle, an embodiment of the invention further provides correspondingly a local base station as illustrated in FIG. 5b generally including:

A transceiver 503 is configured to receive an RLF report transmitted by a User Equipment (UE); and A processor 504 is configured to forward the RLF report to a macro base station through the transceiver 503 upon determining that the RLF report received by the transceiver 503 relates to a connection failure related to bearer splitting, so that the macro base station determines a connection failure reason according to the RLF report, and bearer splitting and restoring procedures, and a macro base station involved in the connection failure reason adjusts a parameter.

Figure 6:
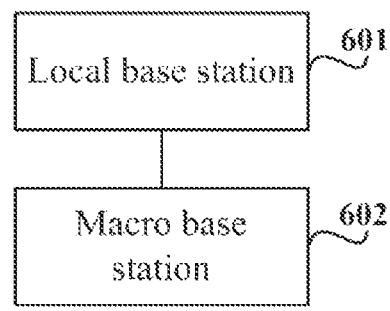
FIG. 6 illustrates a schematic structural diagram of a network optimization system for a radio link failure according to an embodiment of the invention.

An embodiment of the invention further provides correspondingly a network optimization system for a radio link failure as illustrated in FIG. 6 including:

A local base station 601 is configured to receive an RLF report transmitted by a User Equipment (UE), and to forward the RLF report to a macro base station upon determining that the RLF report relates to a connection failure related to bearer splitting; and The macro base station 602 is configured to receive the RLF report forwarded by the local base station; and to determine a connection failure reason according to the RLF report, and bearer splitting and restoring procedures, so that a macro base station involved in the connection failure reason adjusts a parameter.

The embodiments of the invention provide a network optimization method, device and system for a radio link failure, where if the local base station determines that the RLF report transmitted by the UE relates to a connection failure to bearer splitting upon reception of the RLF report, then the local base station transmits the RLF report to the macro base station, and the macro base station determines the connection failure reason according to the RLF report, and the bearer splitting and restoring procedures, so that the macro base station involved in the connection failure reason adjusts the parameter and sets the parameter related to bearer splitting by configuring and optimizing the macro base station according to the RLF report made by the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto no long as the modifications and variations come into the scope of the claims appended to the invention and their equivalents.

The invention claimed is:

1. A network optimization method for a radio link failure, the method comprising:
   receiving, by a macro base station, a Radio Link Failure, RLF, report forwarded by a local base station, wherein the local base station receives the RLF report transmitted by a User Equipment, UE, and forwards the RLF report to the macro base station upon determining that the RLF report relates to a connection failure related to bearer splitting; and
   determining, by the macro base station, a connection failure reason according to the RLF report, and bearer splitting and restoring procedures, and adjusting a parameter;
   wherein adjusting the parameter comprises adjusting the parameter upon determining that the connection failure is unrelated to a handover procedure according to the RLF report, and includes at least one of:
   adjusting the bearer split too early related parameter upon determining that the connection failure occurs in the bearer splitting procedure or occurs in a preset period of time after bearer splitting, and the UE reestablishes a bearer in a source cell of bearer splitting;
   adjusting the bearer split too late related parameter upon determining that the connection failure occurs after the preset period of time after bearer splitting, and the UE reestablishes a bearer in a cell other than the source cell of bearer splitting; or
   adjusting the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

2. The method according to claim 1, wherein determining that the RLF report relates to a connection failure unrelated to the handover procedure but related to bearer splitting comprises:
   determining that a temporal value of the connection failure of bearer splitting in the RLF report is above a preconfigured threshold, or there is no macro cell handover in the bearer splitting procedure.

3. The method according to claim 1, wherein determining, by the macro base station, the connection failure reason according to the RLF report, and the bearer splitting and restoring procedures, and adjusting the parameter further comprise:
   determining, by the macro base station, the connection failure reason according to the RLF report, and the bearer splitting and restoring procedures, and transmitting the connection failure reason to a source macro base station of the handover procedure upon determining that the connection failure is related to the source macro base station; and
   adjusting, by the source macro base station, the parameter according to the connection failure reason.

4. The method according to claim 3, wherein determining that the connection failure is related to the source macro base station of the handover procedure comprises:
   determining that the temporal value of the connection failure of bearer splitting in the RLF report is below or equal to a preconfigured threshold, or there is a macro cell handover in the bearer splitting procedure.

5. The method according to claim 3, wherein determining, by the macro base station, the connection failure reason according to the RLF report, and the bearer splitting and restoring procedures comprises at least one of:
   determining the connection failure reason as bearer split too early upon determining that the connection failure occurs in the bearer splitting procedure or occurs in a preset period of time after bearer splitting, and the UE reestablishes a Radio Bearer, RB, in a source cell;
   determining the connection failure reason as bearer split too late upon determining that the connection failure occurs after the preset period of time after bearer splitting, and the UE reestablishes an RB in a destination cell; or
   determining the connection failure reason as bearer split to wrong cell upon determining that the connection failure occurs in the bearer splitting procedure or occurs in the preset period of time after bearer splitting, and the UE reestablishes an RB in a cell other than the destination cell or the source cell.

6. A network optimization method for a radio link failure, the method comprising:
   receiving, by a local base station, a Radio Link Failure, RLF, report transmitted by a User Equipment, UE; and forwarding, by the local base station, the RLF report to a macro base station upon determining that the RLF report relates to a connection failure related to bearer splitting, wherein the macro base station determines a connection failure reason according to the RLF report, and bearer splitting and restoring procedures, and a parameter is adjusted;

wherein the parameter is adjusted upon determining that the connection failure is unrelated to a handover procedure according to the RLF report, by at least one of:

adjusting the bearer split too early related parameter upon determining that the connection failure occurs in the bearer splitting procedure or occurs in a preset period of time after bearer splitting, and the UE reestablishes a bearer in a source cell of bearer splitting;

adjusting the bearer split too late related parameter upon determining that the connection failure occurs after the preset period of time after bearer splitting, and the UE reestablishes a bearer in a cell other than the source cell of bearer splitting; or adjusting the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

7. A macro base station, comprising:
a transceiver configured to receive a Radio Link Failure, RLF, report forwarded by a local base station, wherein the local base station receives the RLF report transmitted by a User Equipment, UE, and forwards the RLF report upon determining that the RLF report relates to a connection failure related to bearer splitting; and
a processor configured to determine a connection failure reason according to the RLF report received by the transceiver, and bearer splitting and restoring procedures, and to adjust a parameter;
wherein the processor configured to adjust the parameter upon determining that the connection failure is unrelated to a handover procedure according to the RLF report, by at least one of:
adjusting the bearer split too early related parameter upon determining that the connection failure occurs in the bearer splitting procedure or occurs in a preset period of time after bearer splitting, and the UE reestablishes a bearer in a source cell of bearer splitting;
adjusting the bearer split too late related parameter upon determining that the connection failure occurs after the preset period of time after bearer splitting, and the UE reestablishes a bearer in a cell other than the source cell of bearer splitting; or
adjusting the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

8. The macro base station according to claim 7, wherein the processor configured to determine that the RLF report relates to a connection failure unrelated to the handover procedure but related to bearer splitting is configured:
to determine that a temporal value of the connection failure of bearer splitting in the RLF report is above a preconfigured threshold, or there is no macro cell handover in the bearer splitting procedure.

9. The macro base station according to claim 7, wherein the processor is further configured:
to determine the connection failure reason according to the RLF report, and the bearer splitting and restoring procedures, and to transmit the connection failure reason to a source macro base station of the handover procedure upon determining that the connection failure is related to the source macro base station, wherein the source macro base station adjusts the parameter according to the connection failure reason.

10. The macro base station according to claim 9, wherein the processor configured to determine that the connection failure is related to the source macro base station of the handover procedure is configured:
to determine that the temporal value of the connection failure of bearer splitting in the RLF report is below or equal to a preconfigured threshold, or there is a macro cell handover in the bearer splitting procedure.

11. The macro base station according to claim 9, wherein the processor configured to determine the connection failure reason according to the RLF report, and the bearer splitting and restoring procedures is configured to at least one of:
determine the connection failure reason as bearer split too early upon determining that the connection failure occurs in the bearer splitting procedure or occurs in a preset period of time after bearer splitting, and the UE reestablishes a Radio Bearer, RB, in a source cell;
determine the connection failure reason as bearer split too late upon determining that the connection failure occurs after the preset period of time after bearer splitting, and the UE reestablishes an RB in a destination cell; or
determine the connection failure reason as bearer split to wrong cell upon determining that the connection failure occurs in the bearer splitting procedure or occurs in the preset period of time after bearer splitting, and the UE reestablishes an RB in a cell other than the destination cell or the source cell.

12. A local base station, comprising:
a transceiver configured to receive an RLF report transmitted by a User Equipment, UE; and
a processor configured to forward the RLF report to a macro base station through the transceiver upon determining that the RLF report received by the transceiver relates to a connection failure related to bearer splitting, wherein the macro base station determines a connection failure reason according to the RLF report, and bearer splitting and restoring procedures, and a parameter is adjusted;
wherein the parameter is adjusted upon determining that the connection failure is unrelated to a handover procedure according to the RLF report, by at least one of:
adjusting the bearer split too early related parameter upon determining that the connection failure occurs in the bearer splitting procedure or occurs in a preset period of time after bearer splitting, and the UE reestablishes a bearer in a source cell of bearer splitting;
adjusting the bearer split too late related parameter upon determining that the connection failure occurs after the preset period of time after bearer splitting, and the UE reestablishes a bearer in a cell other than the source cell of bearer splitting; or
adjusting the bearer split to wrong cell related parameter upon determining that the connection failure occurs in the bearer splitting procedure or occurs in the preset period of time after bearer splitting, and the UE reestablishes a bearer in a cell other than the source cell and a destination cell of bearer splitting.

* * * * *